(12) United States Patent
Uchihashi

(10) Patent No.: US 9,899,061 B2
(45) Date of Patent: Feb. 20, 2018

(54) REPRESENTATIVE FRAME SELECTING SYSTEM AND NON-TRANSITORY COMPUTER READABLE MEDIUM

(71) Applicant: FUJI XEROX CO., LTD., Tokyo (JP)

(72) Inventor: Shingo Uchihashi, Yokohama (JP)

(73) Assignee: FUJI XEROX CO., LTD., Tokyo (JP)

( * ) Notice: Subject to any disclaimer, the term of this patent is extended or adjusted under 35 U.S.C. 154(b) by 191 days.

(21) Appl. No.: 14/331,785

(22) Filed: Jul. 15, 2014

(65) Prior Publication Data

US 2015/0187062 A1 Jul. 2, 2015

(30) Foreign Application Priority Data

Dec. 27, 2013 (JP) ................. 2013-271957

(51) Int. Cl.
| | |
|---|---|
| *G06K 9/46* | (2006.01) |
| *G11B 27/34* | (2006.01) |
| *G06F 17/30* | (2006.01) |
| *G11B 27/031* | (2006.01) |
| *G11B 27/28* | (2006.01) |
| *G06K 9/00* | (2006.01) |

(52) U.S. Cl.
CPC ........ *G11B 27/34* (2013.01); *G06F 17/30843* (2013.01); *G06K 9/00765* (2013.01); *G11B 27/031* (2013.01); *G11B 27/28* (2013.01)

(58) Field of Classification Search
CPC ...... H04N 5/147; H04N 19/142; H04N 19/87; H04N 2201/325
See application file for complete search history.

(56) References Cited

U.S. PATENT DOCUMENTS

| | | | |
|---|---|---|---|
| 6,192,151 | B1 | 2/2001 | Miyatake et al. |
| 6,535,639 | B1 | 3/2003 | Uchihachi et al. |
| 2007/0168867 | A1 | 7/2007 | Hiroi et al. |
| 2010/0128929 | A1 | 5/2010 | Jang et al. |
| 2012/0027295 | A1* | 2/2012 | Shao ................. G06F 17/30781 382/170 |

(Continued)

FOREIGN PATENT DOCUMENTS

| | | |
|---|---|---|
| JP | A-2000-308008 | 11/2000 |
| JP | A-2003-348528 | 12/2003 |
| JP | A-2007-189473 | 7/2007 |

OTHER PUBLICATIONS

May 20, 2015 Office Action issued in Australian Patent Application No. 2014204550.

*Primary Examiner* — Christopher Findley
(74) *Attorney, Agent, or Firm* — Oliff PLC

(57) ABSTRACT

A representative frame selecting system includes: an importance obtaining unit that obtains importance of each frame from calculating on the basis of a length of a similar frame interval formed of consecutive frames each of which has a value according to a similarity between each of the frames included in video information that is equal to or more than a standard; an evaluation value obtaining unit that obtains an evaluation value of each frame from calculating on the basis of an evaluation standard from frames adjacent to each frame; and a representative frame selecting unit that selects at least one representative frame among the frames included in the video information, on the basis of the importance and the evaluation value of each frame.

10 Claims, 5 Drawing Sheets

(56) References Cited

U.S. PATENT DOCUMENTS

2012/0106925 A1* 5/2012 Dirik ................ H04N 5/147
　　　　　　　　　　　　　　　　　　　386/240
2014/0099034 A1* 4/2014 Rafati ............... G06T 7/0028
　　　　　　　　　　　　　　　　　　　382/209

* cited by examiner

REPRESENTATIVE FRAME SELECTING SYSTEM AND NON-TRANSITORY COMPUTER READABLE MEDIUM

CROSS-REFERENCE TO RELATED APPLICATIONS

This application is based on and claims priority under 35 USC 119 from Japanese Patent Application No. 2013-271957 filed on Dec. 27, 2013.

BACKGROUND

Technical Field

The present invention relates to a representative frame selecting system and a non-transitory computer readable medium storing a representative frame selecting program.

SUMMARY

According to an aspect of the present invention, it is a representative frame selecting system including: an importance obtaining unit that obtains importance of each frame from calculating on the basis of a length of a similar frame interval formed of consecutive frames each of which a value according to a similarity between each of the frames included in video information is equal to or more than a standard; an evaluation value obtaining unit that obtains an evaluation value of each frame from calculating on the basis of an evaluation standard from frames adjacent to each frame; and a representative frame selecting unit that selects at least one representative frame among the frames included in the video information, on the basis of the importance and the evaluation value of each frame.

BRIEF DESCRIPTION OF THE DRAWINGS

Exemplary embodiment(s) of the present invention will be described in detail based on the following figures, wherein.

DETAILED DESCRIPTION

Figure 1:
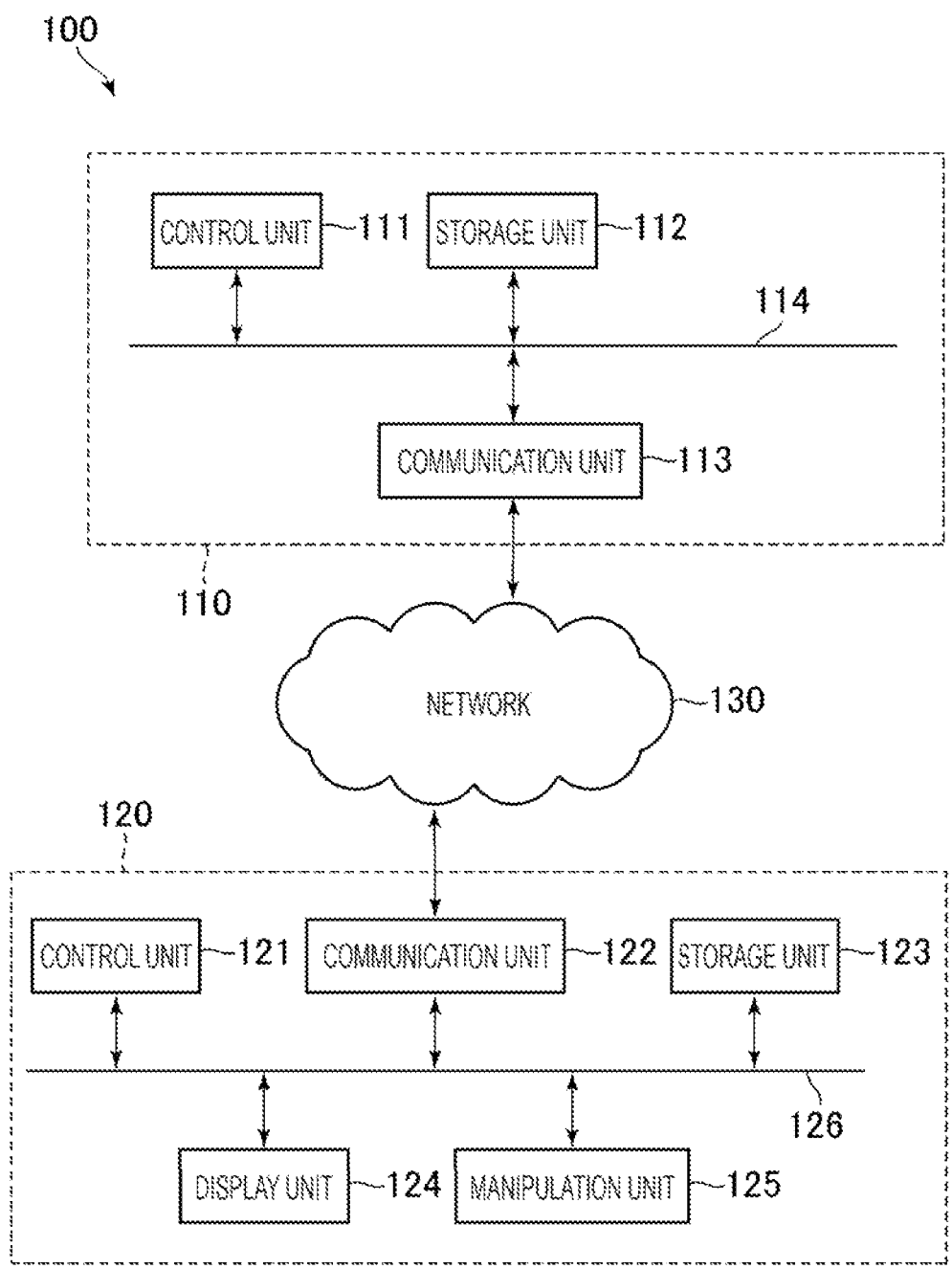
FIG. 1 is a diagram illustrating an example of an outline of a hardware configuration of a representative frame selecting system according to the present embodiments.

FIG. 1 is a diagram illustrating an example of an outline of a hardware configuration of a representative frame selecting system according to the present invention. As shown in FIG. 1, a representative frame selecting system 100 includes a server 110 and a terminal 120 which are connected through a network 130 (for example, the Internet). Furthermore, in FIG. 1, the representative frame selecting system 100 has only one terminal 120, but may additionally have plural terminals 120. In addition, the representative frame selecting system 100 may be configured so as to include a so-called multifunction machine having a scanner or a copy function (not shown).

The server 110 includes a control unit 111, a storage unit 112, and a communication unit 113. For example, the control unit 111 is a CPU or the like, and operates according to a program which is stored in the storage unit 112. For example, the storage unit 112 is configured of an information recording medium such as a hard disk, a ROM, a RAM and the like, and is the information recording medium that holds the program which is executed by the control unit 111. Furthermore, the storage unit 112 also operates as a work memory of the control unit 111.

The communication unit 113 is a network interface, and sends and receives information, through the network 130, according to an instruction from the control unit 111. Moreover, the control unit 111, the storage unit 112, and the communication unit 113 are connected through a bus 114, respectively.

The terminal 120 includes a control unit 121, a communication unit 122, a storage unit 123, a display unit 124, and an manipulation unit 125. Similarly, the respective units 120 to 125 are connected through a bus 126. In the same manner as the server 110 described above, the control unit 121 is, for example, the CPU, and operates according to the program which is stored in the storage unit 112. For example, the storage unit 123 is configured of the information recording medium such as the hard disk, the ROM, the RAM and the like, and is the information recording medium that holds the program which is executed by the control unit 121. Furthermore, the storage unit 123 also operates as a work memory of the control unit 121.

For example, the manipulation unit 125 is configured of an interface such as a keyboard, a mouse and a button, and outputs contents of an instruction operation to the control unit 121, according to the instruction operation of a user. For example, the display unit 124 is a liquid crystal display, a CRT display, an organic EL display or the like, and displays the information, according to the instruction from the control unit 121.

Moreover the program which is processed with the control units 111 and 121 described above, may be provided to be downloaded, for example, through the network 130, or may be provided by the various information recording mediums which can be read with a computer such as a CD-ROM and a DVD-ROM. Furthermore, the configuration of the server 110 and the terminal 120 described above, is merely an example, and is not limited thereto. In the above description, the representative frame selecting system 100 in case of being configured with a so-called server client system, is described, but the present embodiments are not limited thereto. The representative frame selecting system 100 may be configured using a so-called cloud technology, or may be configured as a single apparatus such as one computer.

Figure 2:
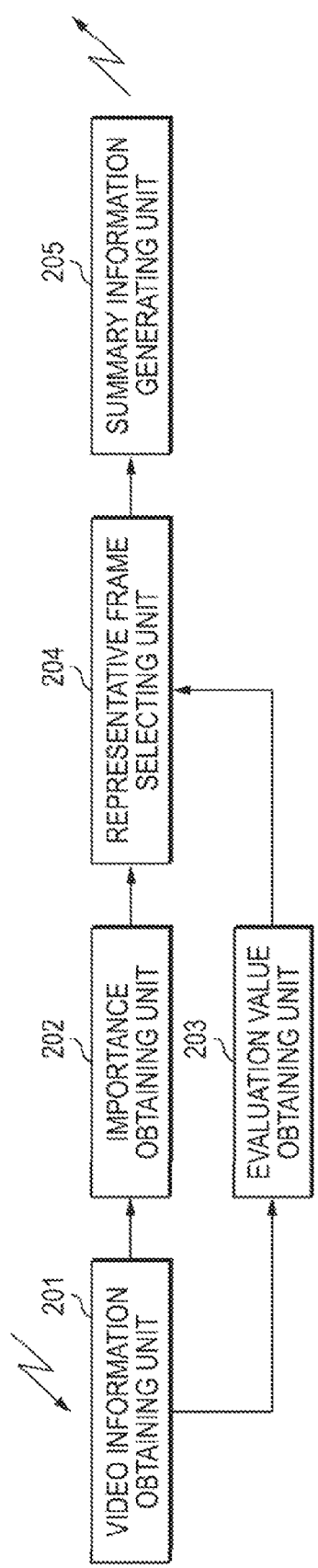
FIG. 2 is a diagram illustrating an example of a functional configuration of a server shown in FIG. 1.

Next, a functional configuration of the representative frame selecting system 100 according to the present embodiments, will be described. FIG. 2 is a diagram for describing an example of the functional configuration of the server shown in FIG. 1. As shown in FIG. 2, the server 110 functionally includes a video information obtaining unit 201, an importance obtaining unit 202, an evaluation value obtaining unit 203, a representative frame selecting unit 204, and a summary information generating unit 205.

Here, the video is a recording or synthesis of a sequence of plural image frames that form a moving picture.

The video information obtaining unit 201 obtains video information. For example, the video information includes plural image frames. The video information is provided, for example, from the terminal.

The importance obtaining unit 202 obtains importance of each frame from calculating on the basis of a length of a similar frame interval formed of consecutive frames each of which similarity between each of frames included in the video information is equal to or more than a standard to be preset, and on the basis of an average similarity between each of the frames for each frame.

Figure 3:
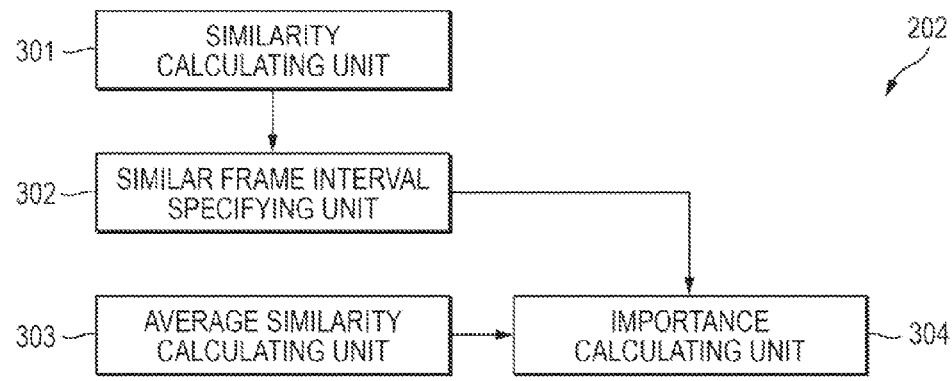
FIG. 3 is a diagram illustrating an example of a functional configuration of an importance obtaining unit shown in FIG. 2.

Specifically, for example, as shown in FIG. 3, the importance obtaining unit 202 functionally includes a similarity calculating unit 301, a similar frame interval specifying unit 302, an average similarity calculating unit 303, and an importance calculating unit 304.

The similarity calculating, unit 301 calculates the similarity between each of the frames. Specifically, for example, in each frame, the similarity calculating unit 301 calculates the similarity between each of the frames, based on a color distribution, a distribution in an edge direction, or a distance relationship of a color pair. In the following description, the similarity is expressed in the following, formulae (1) and (2). Here, N expresses the number of the total frames which are included in the video, and s expresses the similarity. That is, $S_{ij}$ expresses the similarity of the i-th frame and the j-th frame.

[Formula 1]

$$s_i=1, s_{ij}\geq 0 \quad (1)$$

[Formula 2]

$$i,j=1,\ldots,N \quad (2)$$

The similar frame interval specifying unit 302 specifies the length of the section (similar frame interval) formed of the consecutive frames which are similar to one another. Specifically, for example, the similar frame interval specifying unit 302 specifies the length of the section formed of the consecutive frames each of which a value according to the similarity satisfies a predetermined standard. More specifically, for example, the similar frame interval specifying unit 302 specifies the length of the similar frame interval by calculating a left end and a right end of the similar frame interval, on the basis of the following formulae (3) and (4). Here, in the formulae (3) and (4), t expresses a threshold to be preset, and k expresses a natural number of 1 to N. Furthermore, for example, the similar frame interval specifying, unit 302 may be configured so as to specify the similar frame interval by another method such that the section formed of the consecutive frames each of which the similarity is equal to or more than the threshold to be preset is simply specified as a similar frame interval.

[Formula 3]

$$l_i=\min_k \Pi_{j=k}^{i} s_i > t \quad (3)$$

[Formula 4]

$$r_i=\max_k \Pi_{j=i}^{k} s_{ij} > t \quad (4)$$

The average similarity calculating unit 303 calculates the average similarity. Specifically, the average similarity calculating unit 303 calculates the average similarity, for example, using the following formula (5). Moreover, in the formula (5), $W_i$ expresses the average similarity between the i-th frame and other frames.

[Formula 5]

$$W_i=\Sigma_j s_{ij}/N \quad (5)$$

The importance calculating unit 304 calculates the importance of each frame on the basis of the similar frame interval and the average similarity. Specifically, the importance calculating unit 304 calculates the importance, for example, using the following formula (6). Furthermore, the importance calculating unit 304 may calculate using other formula such that only $(r_i-l_i)$ of the formula (6) is used or only $-\log W_i$ is used.

[Formula 6]

$$S_i=-(r_i-l_i)\log W_i \quad (6)$$

The evaluation value obtaining unit 203 obtains an evaluation value of each frame. Specifically, for example, the evaluation value obtaining unit 203 obtains the evaluation value of each frame, on the basis of an evaluation standard to be preset, from the plural frames (hereinafter, referred to as neighborhood frames) which are adjacent to the frame as a target, for example, the frames of 15 to 100. Here, the evaluation standard to be preset, for example, corresponds to the standard based on a front face degree and a smiling face degree of a main face, a matching degree with a predetermined composition, a smallness of variation in a camera parameter, a smallness of a movement, a size of an amount which starts to move, or the like in a subject which is included in the frame between the neighborhood frames and the target frame.

The representative frame selecting unit 204 selects at least one representative frame, among each of the frames included in the video, on the basis of the importance and the evaluation value of each frame. Specifically, for example, the representative frame selecting unit 204 selects the frame of which an integrated evaluation value of each frame calculated on the basis of the importance and the evaluation value of each frame is local maximum, as a representative frame.

Figure 4:
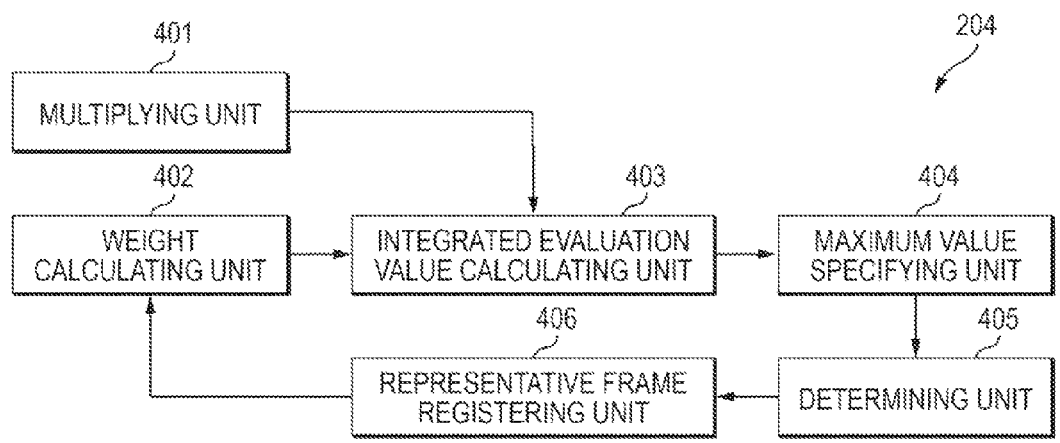
FIG. 4 is a diagram illustrating an example of a functional configuration of a representative frame selecting unit shown in FIG. 2.

Here, an example of more specific functional configuration of the representative frame selecting unit 204, will be described. As shown in FIG. 4, the representative frame selecting unit 204 includes, for example, a multiplying unit 401, a weight calculating unit 402, an integrated evaluation value calculating unit 403, a maximum value specifying unit 404, a determining unit 405, and a representative frame registering unit 406.

The multiplying unit 401 multiplies the importance and the evaluation value of each frame, respectively.

The weight calculating unit 402 calculates a weight according to the similarity of the representative frame that is registered as described later. Specifically, the weight calculating unit 402 calculates, for example, on the basis of the formula (7). Here, k expresses the representative frame which is selected in what number, and $\{a\}_k$ expresses the weight to be preset. Moreover, the $\{a\}_k$ may be a constant value, or may be the value which varies according to k.

[Formula 7]

$$w_i=\Pi_k(1-\alpha_k s_{ij}) \quad (7)$$

The integrated evaluation value calculating unit 403 calculates the integrated evaluation value of each frame, on the basis of the importance of each frame, the evaluation value of each frame, and the weight according to the similarity of the representative frame which is registered as described later. Specifically, for example, the integrated evaluation value calculating unit 403 calculates the integrated evaluation value of each frame by multiplying a multiplication result by the multiplying unit 401, and the weight which is calculated.

Figure 5:
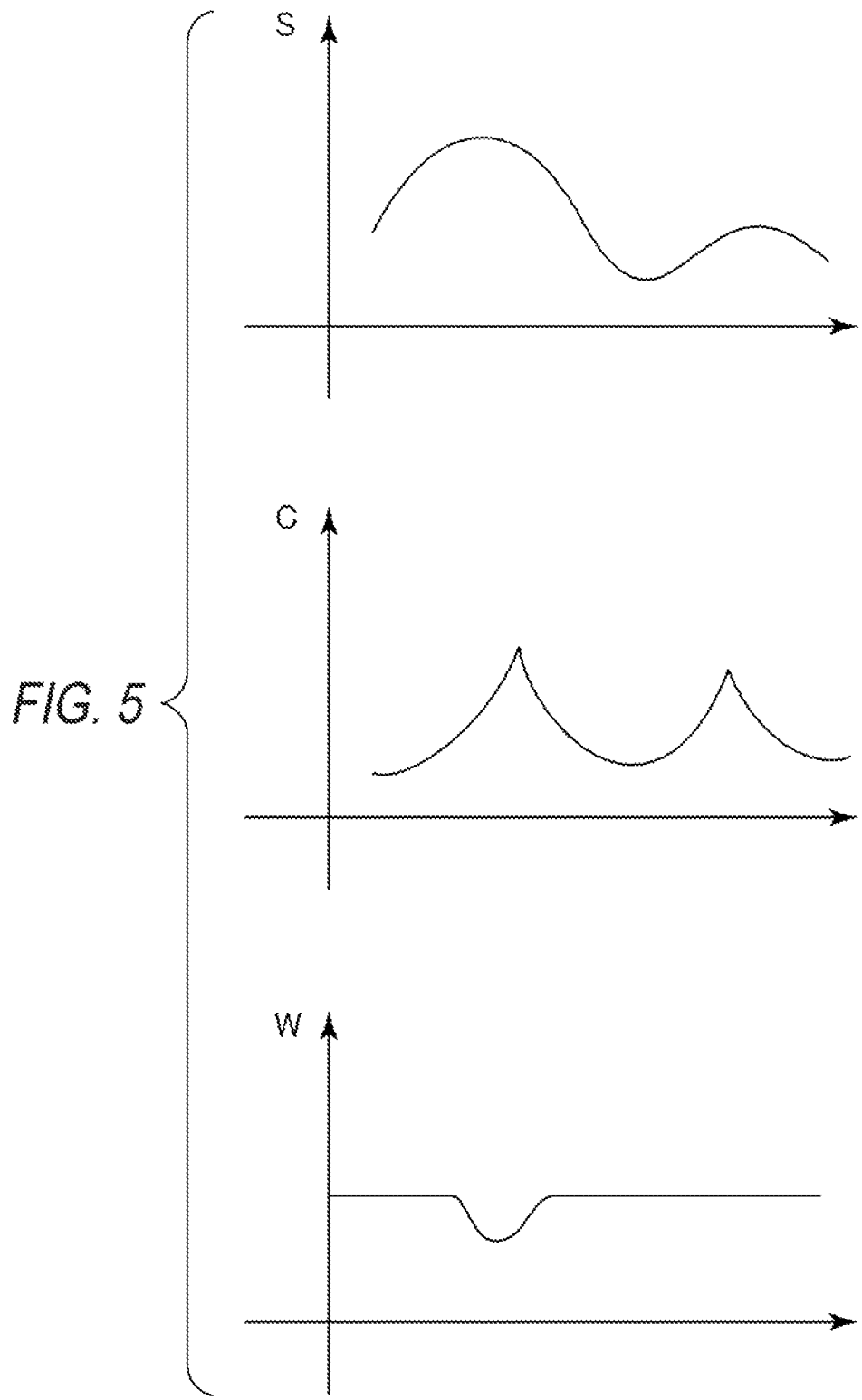
FIG. 5 is a diagram for describing weighting by a weight calculating unit.

The maximum value specifying unit 404 specifies the frame of which the integrated evaluation value calculated expresses the maximum value, as a representative frame. Here, for example, as seen from the formula (7) described above, the weight which is calculated by the weight calculating unit 402, operates so as to reduce the integrated evaluation value with respect to the frame which is similar to the representative frame selected before. Specifically, for example, in case of selecting the second representative frame, when the similarity and the evaluation value are obtained as schematically shown in FIG. 5, the weight operates so as to reduce the integrated evaluation value in the vicinity of the integrated evaluation value of the first representative frame, on the basis of the similarity in the first selected representative frame. Therefore, without specifying the frame in the vicinity of the first representative frame again, as a representative frame, the maximum value specifying unit 404 specifies the maximum value of other integrated evaluation value (the second peak value when seen from the first integrated evaluation value). That is, it is prevented that the frame which is similar to the representative frame selected before, is specified as a representative frame. Furthermore, a horizontal axis in FIG. 5, corresponds to i (expressing the frame of what number among each of the frames included in the video information).

The determining unit 405 determines whether or not the number of the registered representative frames is equal to a threshold to be preset, if the determining unit 405 determines that the number of the registered representative frames is less than the threshold, the representative frame registering unit 406 registers the specified representative frame to the maximum value specifying unit 404. Moreover, as described above, the weight calculating unit 402 calculates the weight, on the basis of the representative frame that is registered. On the other hand, if it is determined that the representative frame of the number to be preset is selected, selecting processing of the representative frame ends.

Based on one or plural representative frames which are selected, the summary information generating unit 205 generates the summary information expressing a summary of the video. Here, for example, the summary information may be configured so as to display the representative frames in order, or may be configured so as to display the representative frames side by side. Furthermore, for example, according to the operation instruction of the user, the summary information which is generated is transmitted to the terminal which is used by the user.

Moreover, the functional configuration of the representative frame selecting system 100 is an example, and the present embodiments are not limited thereto. For example, the terminal 120 or the like may be configured so as to have the portion or all of the functional configuration of the representative frame selecting system 100, or the functional configuration of the representative frame selecting system 100 may be configured so as to be realized in one apparatus. Here, it is needless to say that the representative frame selecting system which is described in the range of the claims, may also include, for example, the case of realizing in the server 110 as described above, in addition, the case of realizing in one apparatus such as the case of realizing in the terminal 120, and the case of realizing in the plural apparatuses such as the case of realizing in the server 110 and the terminal 120.

Figure 6:
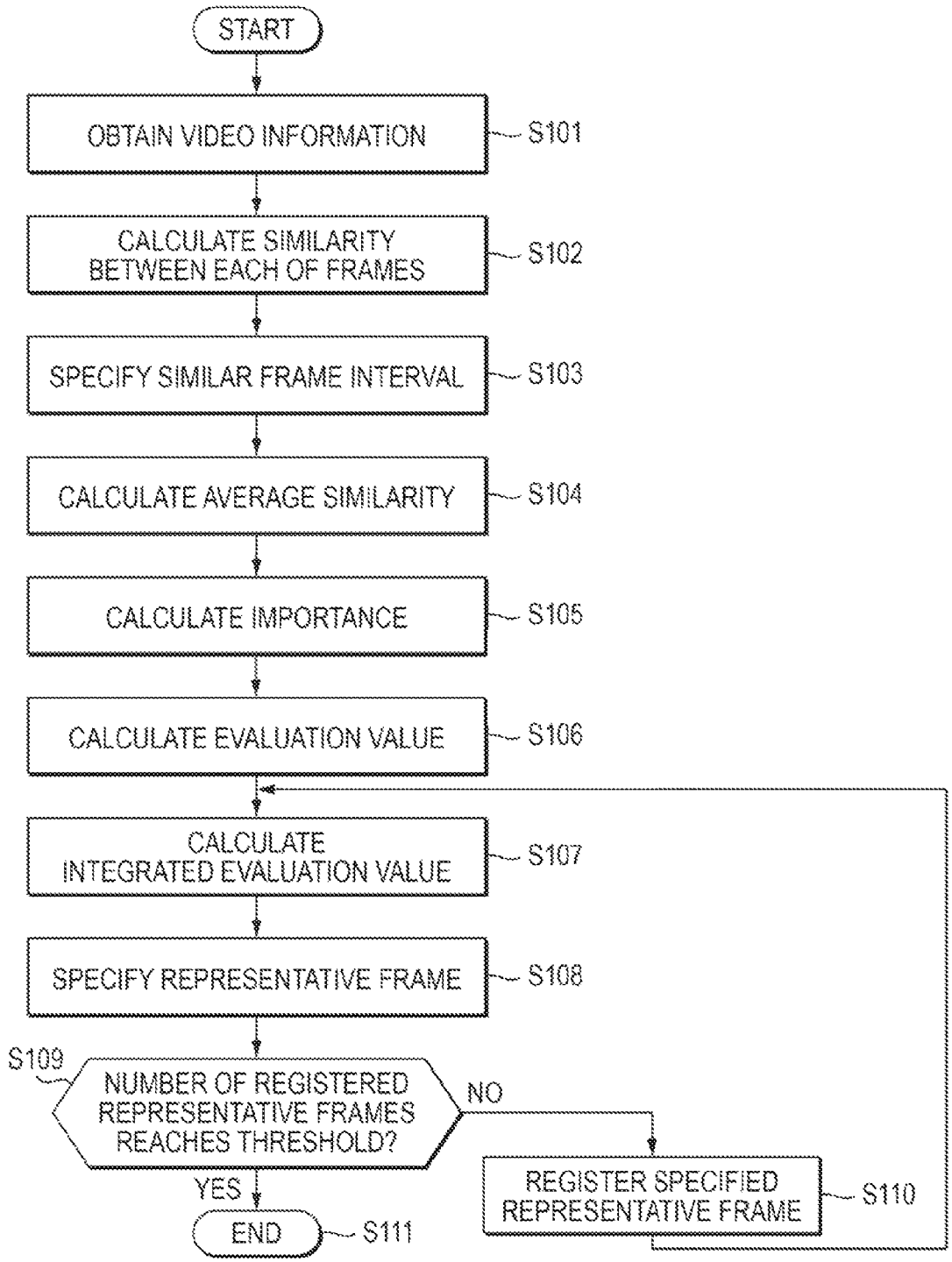
FIG. 6 is a diagram illustrating an example of a flow of processing of the representative frame selecting system.

FIG. 6 is a diagram illustrating an example of a flow of the representative frame selecting processing according to the present embodiments. As shown in FIG. 6, first, the video information obtaining unit 201 obtains the video information (S101). The similarity calculating unit 301 calculates the similarity between each of the frames included in the video information which is obtained in S101 (S102). The similar frame interval specifying unit 302 specifies the length of the section (similar frame interval) formed of the consecutive frames which are similar to one another (S103). The average similarity calculating unit 303 calculates the average similarity (S104). The importance calculating unit 304 calculates the importance of each frame, on the basis of the similar frame interval and the average similarity (S105). The evaluation value obtaining unit 203 obtains the evaluation value of each frame (S106).

The integrated evaluation value calculating unit 403 calculates the integrated evaluation value of each frame, on the basis of the weight according to the importance of each frame, the evaluation value of each frame, and the similarity of the representative frame which is registered in S110 (S107). The maximum value specifying unit 404 specifies the frame of which the integrated evaluation value calculated expresses the maximum value, as a representative frame (S108). The determining, unit 405 determines whether or not the representative frame of the predetermined number is selected (S109). If it is determined that the number of the representative frames is less than a threshold to be preset, the specified representative frame is registered (S110). Therefore, it returns to S107. If it is determined the number of the representative frames is equal to the threshold, the processing ends (S111).

Furthermore, the above flow is an example, and the present embodiments are not limited to the above. For example, the processing of S102 and S105 may be configured so as to perform after the processing of S106, or may be configured so as to perform at the same time.

According to the present embodiments, on the basis of the integrated evaluation value based on the importance of evaluating each frame from the relationship of the whole video information, and the evaluation value which is evaluated from the neighborhood frames thereof, the representative frame is selected. Hereby, the frame which more visually gives a large amount of the information and a favorable impression from the video, is selected.

The present invention is not limited to the above embodiments, and can be variously modified. For example, it is possible to replace with the configuration that is substantially same as the configuration shown in the above embodiments, the configuration that can perform the same operations and effects, or the configuration that can achieve the same object.

For example, instead of the multiplying unit 401 that multiplies the importance and the evaluation value of each frame, respectively, an adding unit that adds by weighting the importance and the evaluation value of each frame, may be arranged, as shown in the following formula (8). In this case, the integrated evaluation value calculating unit 403 may calculate the integrated evaluation value of each frame by multiplying an addition result by the adding unit, and the calculated weight.

[Formula 8]

$$S_i + \beta C_i \tag{8}$$

Moreover, the standard of the evaluation value in the evaluation value obtaining unit 203, may be configured so as to use the plural standards, in case of selecting the plural representative frames. For example, in the case of selecting two representative frames, in the selection of the first representative frame, the integrated evaluation value using the standard by the front face degree of the main face of the subject, is used, and in the selection of the second representative frame, the integrated evaluation value using the standard by the matching degree with the predetermined composition, is used. Furthermore, in the case of selecting the plural representative frames, the standard of the evaluation value may be configured so as to use each standard described above at a rate to be preset. For example, in the case of selecting five representative frames, the integrated evaluation value using the standard by the front degree of the main face, is used in the selection of the first and the second representative frames, and the integrated evaluation value using the standard by the matching degree with the predetermined composition, is used in the selection of the third to the fifth representative frames.

Furthermore, in the above description, the case where the importance calculating unit 304 calculates the importance of each frame, on the basis of the similar frame interval and the average similarity, is described, but it may be configured so as to calculate the importance of each frame, on the basis of any one of the similar frame interval and the average similarity. Moreover, in the above description, the case of selecting the representative frame on the basis of the similarity between each of the frames, is described, but it may be configured so as to select using only the frame of the predetermined number included in the video, for example, the odd-numbered frame.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A representative frame selecting system comprising:
an importance obtaining unit that obtains a plurality of importance for each frame from calculating on the basis of a length of a similar frame interval formed of consecutive frames, each frame in the consecutive frames having a value that is greater than or equal to a standard, the value being derived according to a similarity between each of the frames included in video information;
an evaluation value obtaining unit that obtains a plurality of evaluation values for each frame from calculating on the basis of an evaluation standard from frames adjacent to each frame; and
a representative frame selecting unit that selects at least one representative frame among the frames included in the video information, on the basis of the plurality of importance and the plurality of evaluation values for each frame,
wherein the representative frame selecting unit selects a next representative frame after reducing an evaluation value with respect to a frame which is similar to the representative frame selected before, and
wherein, in a case of selecting two representative frames, the evaluation value obtaining unit obtains the evaluation value using a standard by a front face degree of a main face of the subject in selecting a first representative frame, and obtains the evaluation value using a standard by a matching degree with the predetermined composition in selecting a second representative frame.

2. The representative frame selecting system according to claim 1, wherein the importance of each frame is calculated on the basis of an average similarity between each frame and the other frames.

3. The representative frame selecting system according to claim 1, wherein the representative frame selecting unit that selects at least one frame of which an integrated evaluation value of each frame calculated on the basis of the importance and the evaluation value of each frame is local maximum, as the representative frame.

4. The representative frame selecting system according to claim 3, wherein the integrated evaluation value of each frame is a value of multiplying the importance and the evaluation value of each frame.

5. The representative frame selecting system according to claim 3, wherein the integrated evaluation value of each frame is an additional value of a value according to the importance of each frame and a value according to the evaluation value of each frame.

6. The representative frame selecting system according to claim 3, wherein the integrated evaluation value is obtained by weighting according to similarity of the frame selected as the representative frame before, and
the representative frame selecting unit selects a frame of which the integrated evaluation value expresses a maximum value, as the representative frame.

7. The representative frame selecting system according to claim 1, wherein the evaluation standard includes a plurality of the evaluation standards,
the evaluation value obtaining unit obtains a plurality of the evaluation values of each frame on the basis of the plurality of the evaluation standards, and
the representative frame selecting unit selects a plurality of the representative frames included in the video information, on the basis of the importance and the plurality of the evaluation values of each frame.

8. The representative frame selecting system according to claim 7, wherein the representative frame selecting unit uses each of the plurality of the evaluation standards at a rate, in a case of selecting the plurality of the representative frames.

9. The representative frame selecting system according to claim 1, wherein the evaluation standard is a standard based on at least one of a front face degree and a smiling face degree of a main face, a matching degree with a predetermined composition, a smallness of variation in a camera parameter, a smallness of a movement, and a size of an amount which starts to move of a subject which is included in a frame between a target frame and its neighborhood frames.

10. A non-transitory computer readable medium storing a representative frame selecting program causing a computer to execute a process for selecting a representative frame, the process comprising:
obtaining a plurality of importance for each frame from calculating on the basis of a length of a similar frame interval formed of consecutive frames, each frame in the consecutive frames having a value that is greater than or equal to a standard, the value being derived according to a similarity between each of frames included in video information;

obtaining a plurality of evaluation values for each frame from calculating on the basis of an evaluation standard from frames adjacent to each frame;

selecting at least one representative frame among the frames included in the video information, on the basis of the plurality of importance and the plurality of evaluation values for each frame;

selecting a next representative frame after reducing an evaluation value with respect to a frame which is similar to the representative frame selected before; and in a case of selecting two representative frames, obtaining the evaluation value using a standard by a front face degree of a main face of the subject in selecting a first representative frame, and obtaining the evaluation value using a standard by a matching degree with the predetermined composition in selecting a second representative frame.

* * * * *